United States Patent [19]

Haroun et al.

[11] Patent Number: 5,787,259
[45] Date of Patent: Jul. 28, 1998

[54] DIGITAL INTERCONNECTS OF A PC WITH CONSUMER ELECTRONICS DEVICES

[75] Inventors: Wassef Haroun, Seattle; George M. Moore, Redmond; Forrest Foltz, Kirkland; Edward L. Stubbs, Redmond; Felix Gerard Torquil Ifor Andrew, Seattle, all of Wash.

[73] Assignee: Microsoft Corporation, Redmond, Wash.

[21] Appl. No.: 624,064

[22] Filed: Mar. 29, 1996

[51] Int. Cl.⁶ .......................... H04M 11/00; H04N 7/14
[52] U.S. Cl. ................. 395/200.83; 364/188; 379/93.01; 379/93.28; 348/14; 348/552
[58] Field of Search .................. 364/514 R, 188; 381/18, 118, 119; 379/90, 93, 96, 93.01, 93.28; 395/200.83; 348/14, 552

[56] References Cited

U.S. PATENT DOCUMENTS

5,226,000   7/1993   Moses et al. ..................... 364/724.1
5,283,638   2/1994   Engberg et al. ...................... 348/14
5,283,819   2/1994   Glick et al. ......................... 379/90
5,297,231   3/1994   Miller .............................. 395/2.1
5,402,499   3/1995   Robinson et al. .................. 381/119
5,479,445   12/1995  Kloker et al. ...................... 375/220

Primary Examiner—James P. Trammell
Assistant Examiner—Hien Vo
Attorney, Agent, or Firm—Workman, Nydegger & Seeley

[57] ABSTRACT

A computer includes a housing, a processor positioned in the housing, and an external bus adapter configured to allow the processor to access consumer electronics devices positioned outside of the housing using an external bus. The processor is configured to produce a first digital audio signal, to mix the first digital audio signal with a second digital audio signal to produce a unified digital audio signal, and to transmit the unified digital audio signal to a consumer electronics device using the external bus.

18 Claims, 4 Drawing Sheets

DIGITAL INTERCONNECTS OF A PC WITH CONSUMER ELECTRONICS DEVICES

BACKGROUND OF THE INVENTION

Personal computers have become ubiquitous in both the home and office as technical advances have increased their power and capabilities while simultaneously making them more affordable. Other advances are expected to further increase the role of personal computers, particularly in the home environment. Increasingly sophisticated multimedia applications, for example, promise to make personal computers even more significant as entertainment and educational tools.

SUMMARY OF THE INVENTION

A personal computer may be digitally interconnected with consumer electronics devices using a bus interface. The bus interface permits the personal computer to control various consumer electronics devices such as receivers, video cassette recorders, compact disk players, and digital video disk players. Thus, the personal computer can be used to control all functions of the consumer electronics devices that presently are controlled using the front panels of the various devices. A contemplated application of this approach is to incorporate the personal computer into an entertainment system. Benefits include ease of use, improved functionality, and reduced costs resulting from the elimination of the interface components of the consumer electronics devices.

The new personal computer produces digital audio outputs on an external bus. A problem associated with current personal computers is that, relative to mid-level or high end stereo receivers and other consumer electronics devices, the sound cards available in most personal computers produce low quality analog audio signals. Traditional internal sound cards include inexpensive, low quality digital-to-analog converters. This typically results in low dynamic ranges and a high signal-to-noise ratio for the analog signals produced by the sound cards. In addition, the connection ports on most traditional sound cards tend to introduce more noise into the analog signals when they are coupled to external speakers. The problem is further compounded by the significant amount of radio frequency ("RF") noise produced by the central processing unit and other high frequency components (e.g., modems) within the personal computer. This RF noise tends to interfere with the analog signals produced by the sound card.

The new personal computer addresses these problems by producing digital audio signals that then may be supplied to a stereo receiver or other consumer electronics device to produce high quality analog audio signals. The new personal computer produces digital audio signals by digitally mixing input signals from multiple sources (e.g., software MIDI, compact disk, digital video disk, computer sounds) and producing a digital output at a sample rate appropriate for the receiving device. The digital audio signals are then supplied to the consumer electronics devices using an external digital bus such as IEEE 1394 or Universal Serial Bus (USB).

The provision of digital audio signals on an external bus promises significant advantages beyond the basic improvement in audio quality. For example, the entertainment and educational value of games or other software can be improved by providing sound effects using surround sound features that are becoming increasingly available in home entertainment systems.

The new personal computer may also use external devices to convert the format of the digital audio signal to a format appropriate for a particular consumer electronics device. For example, the new personal computer may use a device for decoding a Dolby AC-3 audio signal into six digital audio channels for connection to left-front, right-front, center, rear-right, rear-left and subwoofer speakers. The use of external decoding dramatically reduces the bandwidth required to transmit audio signals on the system bus.

In one aspect, generally, the invention features a computer that includes a housing, a processor positioned in the housing, and an external bus adapter that allows the processor to access consumer electronics devices positioned outside of the housing using an external bus. The processor is configured to produce a first digital audio signal, to mix the first digital audio signal with a second digital audio signal to produce a unified digital audio signal, and to transmit the unified digital audio signal to a consumer electronics device using the external bus.

The processor may be configured to maintain the first digital audio signal in synchronization with the second digital audio signal, and to produce the unified digital audio signal at a sample rate associated with the consumer electronics device. When the sample rate of the first digital audio signal differs from the sample rate of the second digital audio signal, the processor accounts for the difference between the first and second sample rates in producing the unified digital audio signal. As noted above, the external bus may be an IEEE 1394 bus.

The computer may be included in an entertainment system that has an external bus connected to the external bus adapter of the computer and a consumer electronics device connected to the external bus to receive the unified digital audio signal. Typically, the consumer electronics device is configured to produce an analog audio signal from the unified digital audio signal. The entertainment system may also include speakers connected to the consumer electronics device to produce sound in response to the analog audio signal.

In another aspect, generally, the invention features a computer system that includes an external bus, a computer and a converter. The computer includes a housing, a processor positioned in the housing, and an external bus adapter connected between the processor and the external bus to allow the processor to access consumer electronics devices positioned outside of the housing using the external bus. The processor is configured to produce a first digital audio signal in a format suitable for transmission on the external bus, and to transmit the first digital audio signal to a consumer electronics device using the external bus. The converter is positioned outside of the housing between the external bus and the consumer electronics device. The converter is configured to receive the first digital audio signal from the external bus, to convert the first digital audio signal to a second digital audio signal having a format suitable for use by the consumer electronics device, and to provide the second digital audio signal to the consumer electronics device.

The first digital audio signal may include multiple channels encoded as a single digital signal, and the second digital audio signal may include a separate digital signal for each of the multiple channels. For example, when the first digital audio signal is a surround sound encoded audio signal, the second digital audio signal may include separate digital audio signals corresponding to left-front, right-front, rear-right and rear-left channels.

In another aspect, the invention features a computer system that includes an external bus, a converter connected to the bus, and a computer. The converter is configured to receive a first digital signal from the external bus, to convert the first digital signal to a second digital signal, and to transmit the second digital signal on the external bus. The computer includes a housing, a processor positioned in the housing, and an external bus adapter connected between the processor and the external bus to permit the processor to access consumer electronics devices positioned outside of the housing using the external bus.

The processor may produce the first digital signal, the external bus adapter may transmit the signal on the external bus to the converter. The converter may respond by transmitting the second digital signal on the external bus to a consumer electronics device.

In another aspect, the invention features a computer that includes a housing, a processor positioned in the housing, and an external bus adapter that allows the processor to access consumer electronics devices positioned outside of the housing using an external bus. The processor is configured to produce a digital command signal for changing an operating parameter of a consumer electronics device, and to transmit the digital command signal to the consumer electronics device using the external bus.

The computer may be included in a computer system that also includes an external bus and a consumer electronics device. The consumer electronics device may be connected to the external bus for receipt of the digital command signal. Alternatively, when the consumer electronics device is configured to receive infrared control signals, the system may also include an infrared transmitter connected to the external bus to produce an infrared signal in response to the digital command signal.

Finally, the invention features techniques for obtaining control information for a consumer electronics device in a system in which a computer accesses consumer electronics devices using an external bus. Typically, the control information for the consumer electronics device is stored in a read only memory of the consumer electronics device. When the consumer electronics device is attached to the external bus, the computer queries the read only memory. The consumer electronics device responds by transmitting the control information to the computer using the external bus. The computer then stores the control information.

Other features and advantages of the invention will become clear from the following detailed description, including the claims, when read in conjunction with the drawings.

DESCRIPTION OF THE PREFERRED EMBODIMENTS

As previously noted, the new personal computer may be incorporated into an entertainment system. In this context, it is convenient to refer to the computer as an entertainment computer ("EC"). However, it should be appreciated that the new personal computer also can be employed in other types of systems.

Figure 1:
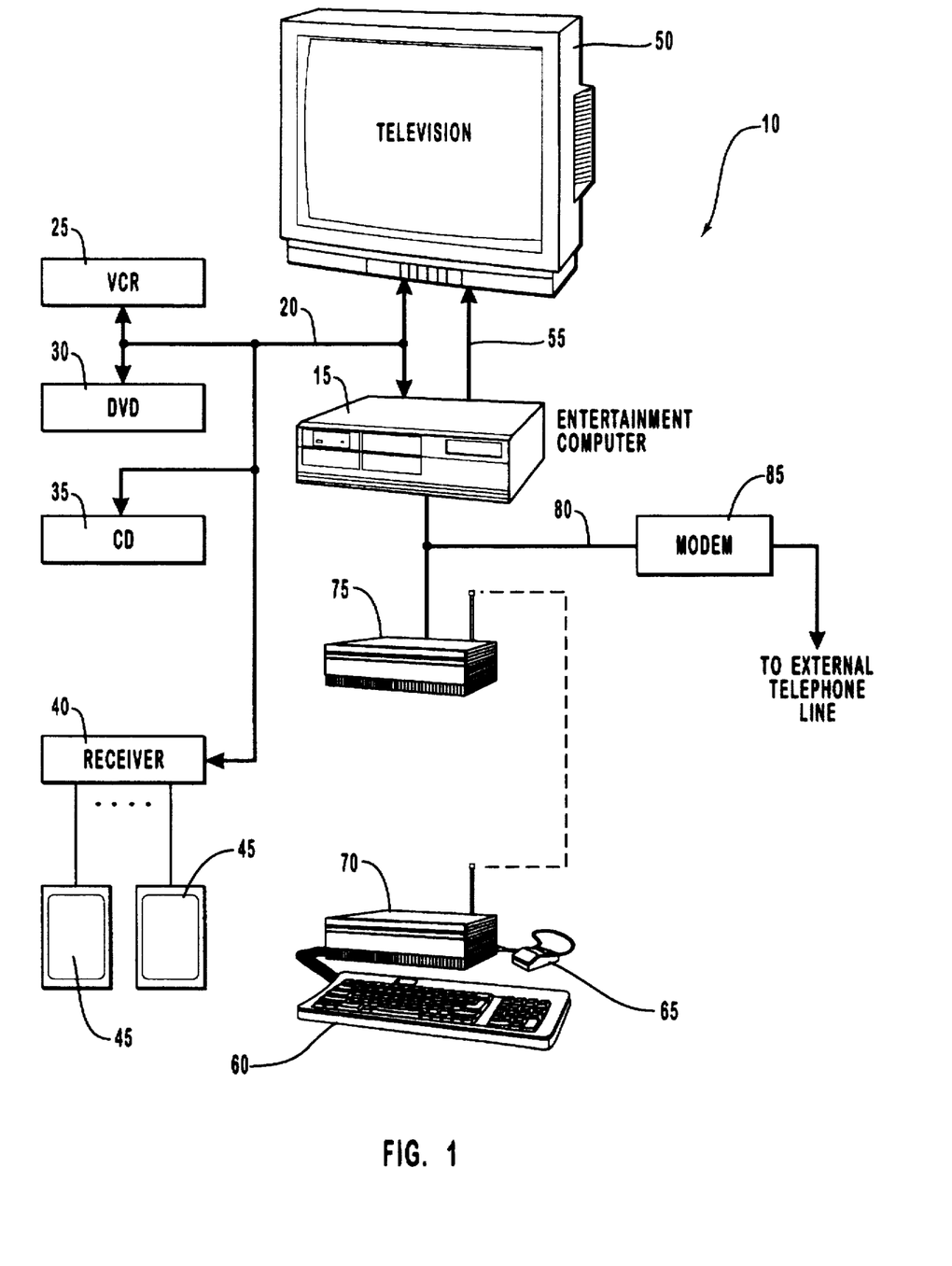
FIG. 1 is a block diagram of an entertainment system.

An entertainment system 10 is illustrated in FIG. 1. The entertainment system includes an EC 15 connected to various consumer electronics devices by a bus 20. Typically, the bus 20 is an industry standard IEEE 1394 bus that runs at a rate of about 100–400 megabits per second. Eventually, most video cassette recorders, digital video disk players, camcorders and similar low to mid bandwidth devices are expected to include connections compatible with the IEEE 1394 bus. Bus 20 could be another type of bus. For example, bus 20 could be a universal serial bus (USB). The USB runs at twelve megabits per second and is designed primarily to support joysticks, mice, keyboards, modems and similar devices.

Bus 20 is connected to a variety of consumer electronics devices including a video cassette recorder (VCR) 25, a digital versatile disk (DVD) player 30, a compact disk (CD) player 35 and a receiver 40. Bus 20 transmits commands and data between the EC 15 and the consumer electronics devices. The EC 15, which controls the bus 20, uses the commands to control the electronics devices. For example, EC 15 might send a command to receiver 40 that would cause the receiver to increase the gain of an amplifier in the receiver and thereby increase the loudness of music or other sounds being produced by speakers 45 connected to the receiver.

The data is the information transferred between the electronics devices and the EC 15. For example, the data may be a digital audio signal transmitted from the CD player 35 to the receiver 40. The receiver 40 then produces an analog audio signal from the digital audio signal and provides the analog audio signal to speakers 45. Similarly, the data may be encoded video data transmitted from VCR 25 or DVD player 30 to EC 15.

EC 15 is also connected to a television 50 by bus 20 and by a separate video path 55. EC 15 controls the television 50 by transmitting commands on the bus 20 and provides video data to the television 50 using video path 55. Video path 55, which typically transmits video data at a rate of 250–300 megabits per second, reduces the burden that would otherwise be imposed by the transmission of video data to the television 50 on bus 20. Where appropriate, video path 55 may provide analog video data to television 50.

A keyboard 60 and a mouse 65 provide user commands to EC 15. The keyboard 60 and the mouse 65 are connected to a first transmitter/receiver hub 70 that communicates with a second hub 75 using infrared or radio frequency signals. The second hub 75 is connected to EC 15 by a bus 80 that typically employs the USB protocol. A modem 85 is also connected to the bus 80 to provide EC 15 with access to an external telephone line. Hubs 70, 75 provide a wireless connection between the input devices and the bus 80. This permits the keyboard and mouse to be placed remotely from the EC 15. If such a wireless connection were unnecessary, then the keyboard and the mouse could be connected directly to the bus 80.

Figure 2:
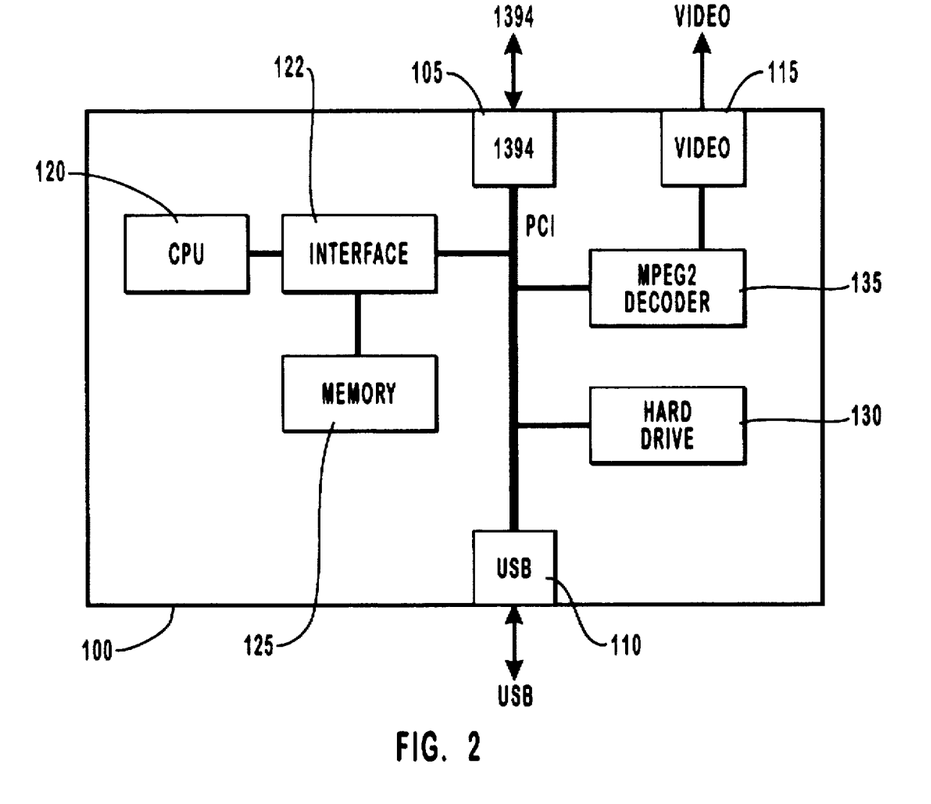
FIG. 2 is a block diagram of an entertainment computer of the entertainment system of FIG. 1.

The internal construction of the EC 15 is illustrated in FIG. 2. EC 15 includes a limited number of operating components that are enclosed within a sealed housing 100, where the housing 100 is sealed in the sense that additional operating components may not be added to EC 15 and the existing operating components of EC 15 may not be modified. The sealed housing 100 dramatically reduces the complexity and cost of the EC 15 by eliminating any need for expansion slots or similar mechanisms. In addition, because every unit of a particular model of EC 15 has an identical configuration, operating system software components such as device drivers can be optimized for enhanced operation on EC 15.

External connections to EC 15 are provided by a 1394 bus connector 105, a USB bus connector 110 and a video port 115. Bus connectors 105 and 110 permit a wide variety of peripherals and consumer electronics devices to be connected to EC 15. This ensures that the sealed housing 100 will not limit the functionality of the EC 15 or the potential capabilities of the entertainment system 10. Video port 115 provides a connection to video path 55.

The operating components that are included within EC 15 are selected to avoid the inclusion of components that are likely to become obsolete within a short period of time. The selected operating components include a central processing unit (CPU) 120, interface chips 122 for the CPU, memory 125, a hard drive 130, and a video processing board 135. CPU 120 is typically an Intel Pentium® processor. Memory 125 typically includes either 16 or 32 megabytes of storage capacity. The hard drive 130 provides storage for operating system and other software.

CPU 120 is connected to the interface chips 122. The interface chips provide a direct connection to the memory 125. The interface chips 122 also provide a connection to an internal bus 137 such as a PCI bus. The internal bus 137 is connected to the remaining components of the EC 15 (i.e., 1394 bus connector 105, USB bus connector 110, hard drive 130 and video board 135).

Video processing board 135 includes an MPEG2 decoder for translating MPEG2 encoded video signals into signals suitable for transmission on video path 55 to television 50 through video port 115. MPEG2 has been selected as the format in which video will be encoded on digital versatile disks (DVD). The inclusion of an MPEG2 decoder on the video processing board 135 of EC 15 means that the DVD player 30 (FIG. 1) does not need to include such a decoder or the processing circuitry associated with the decoder. This, in turn, will permit a reduction in the cost of the DVD player 30. As an alternative, hardware for accessing a DVD for playback of DVD movies and use of DVD-ROM can be included within the EC 15 to eliminate any need for a separate DVD player 30.

Figure 3:
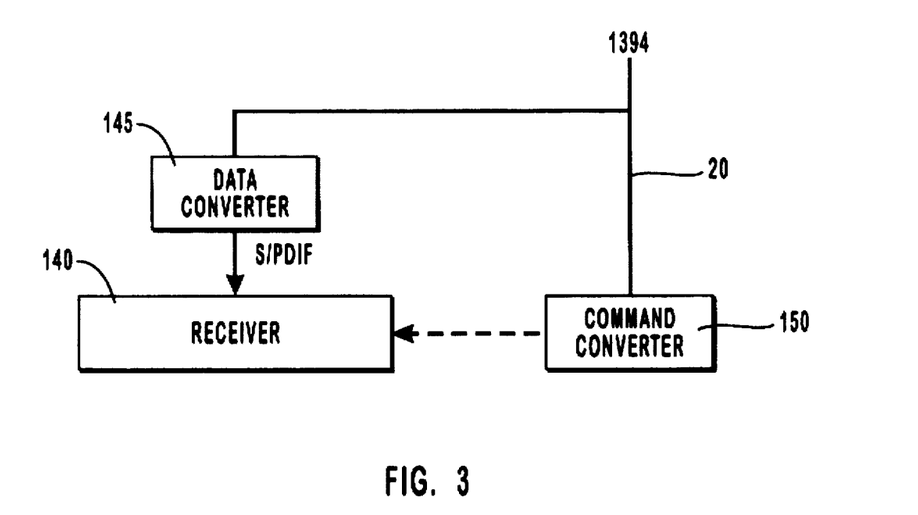
FIG. 3 is a block diagram showing an alternative connection configuration for the entertainment system of FIG. 1.

The consumer electronics devices illustrated in FIG. 1 include IEEE 1394 connectors for direct connection to bus 20. However, consumer electronics devices lacking such IEEE 1394 connectors may also be employed in the entertainment system 10 by using external devices to convert data transmitted on bus 20 to a format suitable for a particular consumer electronics device. For example, as illustrated in FIG. 3, a receiver 140 could be connected to bus 20 using a data converter 145 and a command converter 150.

Data converter 145 converts digital audio data transmitted using the IEEE 1394 format of bus 20 to a format suitable for use by receiver 140. For example, data converter 145 could convert the digital audio signal to SP/DIF, a digital signal format used by many currently available consumer electronics devices. Similarly, data converter 145 could include a digital-to-analog converter for converting the digital audio signal into an analog signal.

Command converter 150 converts command signals transmitted using the IEEE 1394 format of bus 20 to a format suitable for use in controlling receiver 140. For example, if receiver 140 includes an infrared detector for use with a remote control device, then command converter 150 would mimic the remote control device and produce infrared signals corresponding to the commands from bus 20. In some configurations, the command converter 150 is not employed and the consumer electronics device is connected to the bus 20 for the sole purpose of data transmission.

Figure 4:
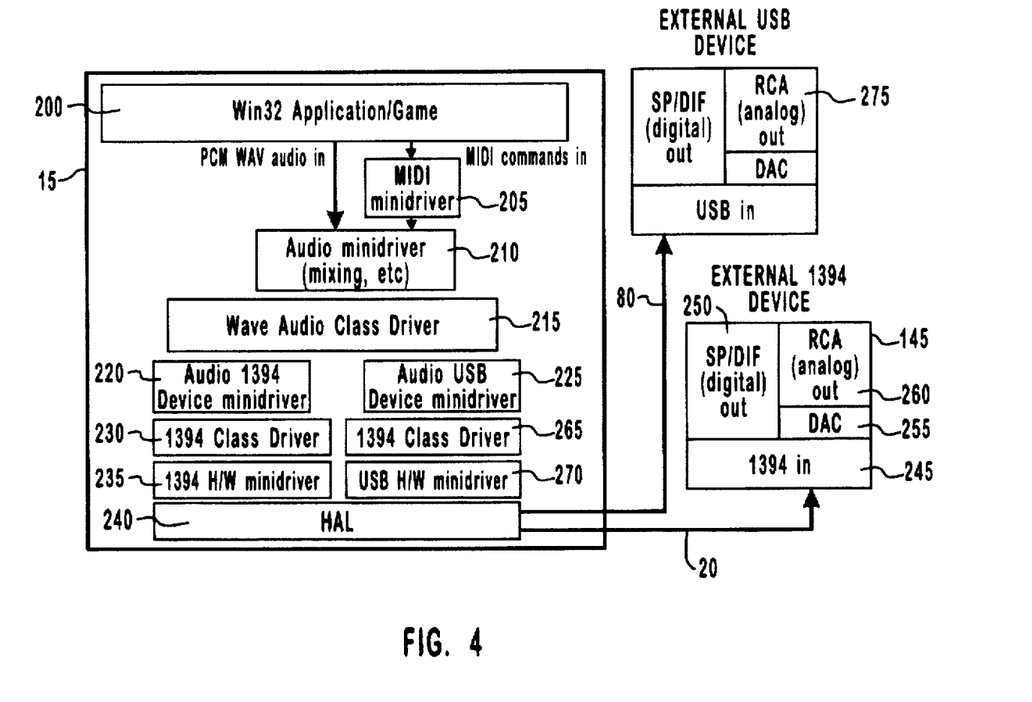
FIG. 4 is a block diagram of a system for producing, transmitting, and decoding digital audio signals.

Bus 20 permits EC 15 to route a high fidelity audio stream to receiver 140 (or receiver 40 of FIG. 1) without any degradation of the signal. FIG. 4 illustrates how a digital audio signal is produced, encoded, routed and decoded. Within the EC 15, an applications program 200 (e.g., a game) requests production of a sound effect. The applications program 200 could, for example, generate a set of MIDI commands corresponding to the desired effect. In this case, a MIDI Minidriver 205 generates a PCM audio file corresponding to the MIDI commands and supplies the audio file to an Audio Minidriver 210. Alternatively, the sound effect could be pre-recorded in an audio file that would be directly supplied to the Audio Minidriver 210. In yet another variation, the sound effect could be a combination of a pre-recorded audio file and a set of MIDI commands, in which case both the pre-recorded file and the file produced by the MIDI minidriver 205 would be supplied to the Audio Minidriver 210.

The Audio Minidriver 210 may receive other audio signals in addition to the pre-recorded audio files and the audio files from the MIDI Minidriver 205. These other signals include, for example, digital audio signals from VCR 25, DVD player 30 and CD player 35.

The Audio Minidriver 210 mixes any received audio signals to produce a unified digital audio signal. Mixing can be a complicated procedure because, in many instances, the mixing involves the combination of digital audio signals having different sample rates that may need to be maintained in synchronization. After mixing, the Minidriver 210 formats the unified digital audio signal to correspond to a monophonic, stereophonic or other multichannel audio signal (e.g., an AC-3 surround sound signal) and provides the resulting signal to the Audio Class Driver 215.

The Audio Class Driver 215 routes the audio signal to bus 20 by supplying the signal to an Audio 1394 Device Minidriver 220. If it was desirable to provide the digital audio signal to a device connected to the USB bus 80, the Driver 215 would instead supply the signal to a Audio USB Device Minidriver 225.

The Audio 1394 Device Minidriver 220 then encapsulates the digital audio signal within a 1394 data stream and provides the 1394 data stream to a 1394 Class Driver 230. In performing the encapsulation, the Minidriver 220 monitors a buffer within the converter 145 and adjusts the data rate of the digital audio signal based on the status of the buffer. If the Minidriver 220 determines that the data rate is too fast (i.e., that the buffer is nearing overflow), then the Minidriver 220 reduces the transmission rate of the audio data signal. If the Minidriver 220 determines that the data rate is too slow (i.e., that the buffer is nearing underflow), then the Minidriver 220 increases the transmission rate of the audio data signal. A clock signal transmitted by the bus 20 serves to synchronize the EC 15 and the converter 145.

The 1394 Class Driver 230 provides the data stream to a 1394 Hardware Minidriver 235. The 1394 Hardware Minidriver 235 communicates with the Hardware Abstraction Layer (HAL) 240 of the EC 15. The HAL 240 knows the ports to which data must be written and from which data must be read to transmit information on the 1394 bus 20 using existing, standardized data streams. The bus 20 makes no distinction between audio data and other data and merely transmits the data provided by the EC 15.

The converter 145 (FIG. 3) receives the data transmitted on the bus 20. Bus hardware 245 within the converter 145 removes 1394 packet headers and other protocol information from the data to produce a digital audio signal. Conversion hardware 250 in the converter 145 then converts the digital audio signal to an appropriate digital format such as a digital SP/DIF signal or RF AC-3 signal. In some instances, a digital-to-analog converter (DAC) 255 within the converter 145 produces an analog signal from the digital audio signal and provides the analog signal to an analog port 260.

Similarly, the Audio USB Device Minidriver 225 encapsulates the digital audio signal within a USB data stream and provides the USB data stream to a USB Class Driver 265. The USB Class Driver 265 then provides the signal to a USB Hardware Minidriver 270. The Minidriver 270 communicates with the HAL 260 to transmit the signal on the bus 80 to an external USB converter 275. The converter 275 includes bus hardware 280, conversion hardware 285, a DAC 290 and an analog port 295 that function as discussed above with respect to the converter 145.

Figure 5:
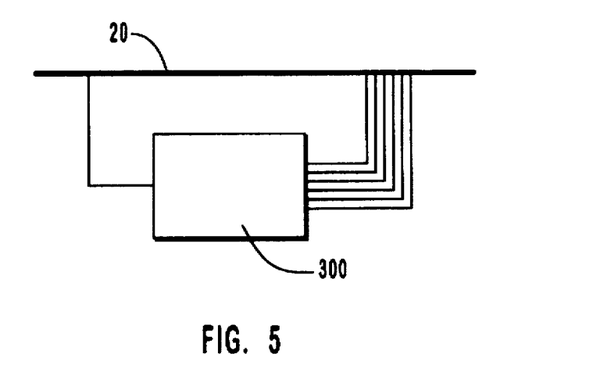
FIG. 5 is a block diagram of a converter for decoding an encoded digital audio signal to produce multiple digital audio signals.

In addition to converting a digital audio signal from a bus format to a format suitable for a consumer electronics device, an external converter can be used to convert digital signals from a first format to a format that may be more easily processed by the EC 15. For example, FIG. 5 illustrates a converter 300 that is configured to convert an encoded Dolby AC-3 audio signal transmitted on bus 20 into six digital audio surround sound channels for connection to left-front, right-front, center, rear-right, rear-left and subwoofer speakers. The surround sound audio channels are then provided to the bus 20 for transmission to the EC 15 for mixing or other processing. Of course, if there were no need to mix in additional audio information, the decoded surround sound signals could be provided directly to the receiver 40 via bus 20, or by a direct connection to the receiver 40. A similar converter could convert a Dolby Prologic surround sound signal encoded in two signals (left and right) into four surround sound channels (right, left, center, rear). Other converters could be provided to perform sample rate conversions and/or filtering.

As previously noted, EC 15 controls the various consumer electronics devices using commands transmitted by bus 20. Each consumer electronics device that incorporates a 1394 connection includes an internal ROM in which is stored a minidriver that may be used to control the device. Information in the minidriver includes a description of the consumer electronics device and an explanation of the set of parameters (e.g., volume, play, stop, rewind) to be controlled for the device. The minidriver also may include information to be incorporated into a graphical user interface displayed for the device. This information could be, for example, a logo of the company that manufactured the device.

The minidriver is downloaded from the consumer electronics device by the operating system software (e.g., Windows 95®) running on the EC 15 to inform the system of the capabilities and identity of the consumer electronics device. When the consumer electronics device is first connected to the bus 20, the operating system software notes the presence of the device on the bus and initiates a download of the necessary minidriver. Thus, the download occurs without user intervention.

Using information from the minidriver, the operating system software creates a graphical user interface that enables a user to remotely control the consumer electronics device. The information from the minidriver also permits an applications program to directly control the device.

A consumer electronics device that does not include a 1394 connection can be controlled using a minidriver that is provided by the manufacturer of the device on a floppy disk or via the Internet instead of being provided in an internal ROM. As noted above, a command converter such as converter 150 (FIG. 3) could then be used to control the device by emulating an infrared remote control for the device or by other means.

The graphical user interface produced by the operating system provides controls for modifying the set of parameters that are appropriate to a particular consumer electronics device. These controls can take on a number of forms, each of which corresponds to a physical control available in present-day consumer electronics devices. These controls include, for example: single click, click and hold, sliders and toggles.

A single click control (e.g., Play, Stop, Eject) performs a single function when it is clicked. Its behavior does not depend on an existing state and does not change when the button is depressed for an extended period.

A click and hold control operates in two modes. It initially changes state upon first being depressed. If it is held down, then it either remains in the new state or changes to a different state. For example, pressing on a fast forward button may initially set the speed of a device to, for example, speed 2, while continuing to depress the button sets the speed to speed 4. Volume controls operate in a similar way.

Slider controls step through a list of states. For example, the recording speed of a VCR may be stepped from SP to LP to EP. Channel controls also step through a set of discrete channels.

Toggle controls simply toggle between two states. For example, a mute button toggles between mute on and mute off. Emulation of a toggle control requires the operating system to know the state of the device.

In addition to identifying the parameters to be controlled, the minidriver provides the operating system with information that permits the operating system or applications software to control those parameters. This information may take the form of a string table that contains all of the commands necessary to control the device. The applications or operating system software may control the operating parameters of the device using commands provided in the string table.

Each string in the string table includes a string identifier. The string identifier has a standard format that includes the identity of the device, the type of device (e.g., AMPLIFIER, CD, TV, TUNER, VCR, CAMCORDER), and the command implemented by the string (e.g., PLAY, STOP, RECORD, EJECT, ON, OFF, FAST FORWARD, REWIND). For example, string identifiers in the string table for a simple amplifier designated as "AMP1" would be:

```
AMP1_AMPLIFIER_ON
AMP1_AMPLIFIER_OFF
AMP1_AMPLIFIER_VOL+
AMP1_AMPLIFIER_VOL-
```

The first two strings turn the amplifier either on or off while the second two strings control the volume of the amplifier by either increasing or decreasing the volume by a single increment.

Inclusion of the device type within the individual string identifiers permits a single device to report that it supports more than one device type. For example, the string table for an infrared transmission hub that is connected to bus 20 and provides infrared control signals for a television and a VCR could include some string identifiers having device type TELEVISION and other string identifiers having device type VCR.

The string table also includes commands corresponding to each string identifier. These commands are used to actually control the device. For example, if an applications program selects AMP1_AMPLIFIER_ON to turn on amplifier AMP1, the operating system software would respond by sending the string table command underlying AMP1_AMPLIFIER_ON to AMP1. String table commands are formatted as:

<Protocol>:<memory address>, <control state>, where the control state is a meta character that is provided to the device as an argument. For example, the string table command underlying AMP1_AMPLIFIER_ON might be "FCP:0b000000.FA01". The command translates to: "this device is FCP compliant, use FCP to set address 0b000000 to FA01". The memory address and the control state are device specific. Because they are provided in the minidriver for the device, the operating system does not need to have any knowledge of their significance.

The graphical user interface for a consumer electronics device may be provided using a simple dialog box. Within the box, a Single Click button has the same identifier as the string that the button controls. The dialog box is displayed by applications software which understands that, when a button is clicked, the identifier of the button is to be used to extract the command string from the string table and send the command to a dispatcher for eventual transmission to the device. The dispatcher then formats the command and sends the command to the appropriate consumer electronics device via bus 20.

Figure 6:
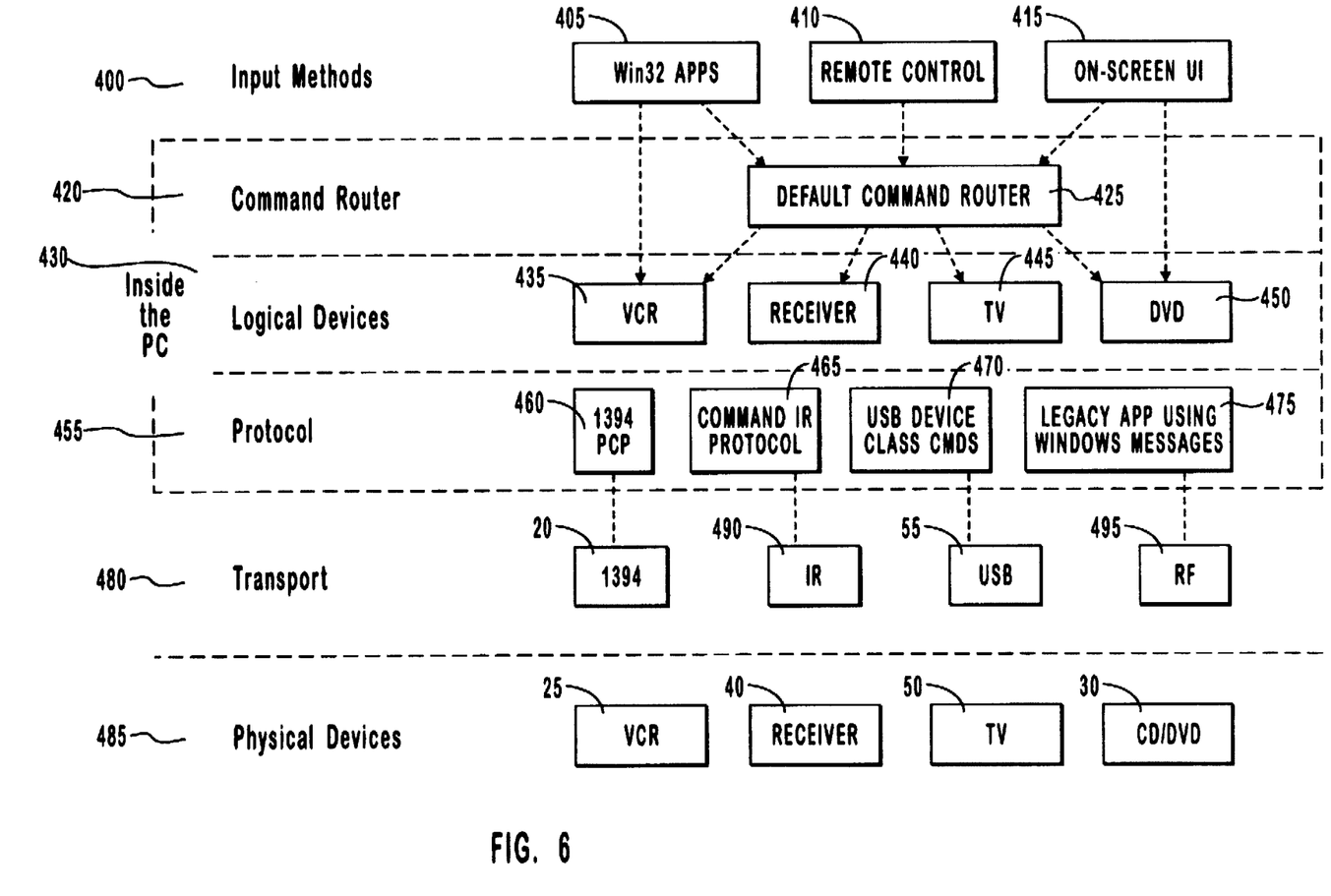
FIG. 6 is a logical diagram of the system of FIG. 1.

Logical operation of the system 10 is illustrated in FIG. 6 using a layered representation. Initially, an input methods layer 400 provides input commands to the system. Sources of input commands include: applications programs 405, infrared or radio frequency remote controls 410 and the user interface 415 discussed above. Each input source may send to the system either generic commands (e.g., "Volume Up") or specific commands (e.g., "Television:Volume Up").

A command router layer 420 is positioned beneath the input methods layer 400. The command router layer 420 includes a Default Command Router 425 to which generic commands are directed. The Default Command Router 425 interprets generic commands based on system parameters and translates the generic commands into appropriate specific commands. For example, the Default Command Router 425 might translate a "Volume Up" command from a remote control 410 to "Receiver:Volume Up" while translating a "Channel Up" command from the remote control 410 to "VCR:Channel Up". In some instances, the Default Command Router 425 might translate a single generic command into several specific commands. For example, the Default Command Router 425 might translate a "Show Movie" command from an applications program 410 to the following series of commands: "Television:On", "VCR:On", "VCR:Play", "Receiver:On", "Receiver:Activate Surround Sound", "Receiver:Volume Up".

A logical device layer 430 positioned beneath the command router layer 420 receives specific commands from the input sources or from the Default Command Router 425. Within the logical device layer 430, each consumer electronics device in the system 10 (FIG. 1) is represented by a logical device (e.g., logical VCR 435, logical receiver 440, logical television 445 and logical DVD player 450). Typically, each logical device exposes a series of OLE interfaces that permit control of the logical device by any OLE-aware application.

The logical devices correspond generally to the string tables discussed above and the Audio class driver 215 discussed with respect to FIG. 4. Each logical device includes information that permits the logical device to communicate with a corresponding physical device. This information includes the appropriate transport (e.g., 1394 or USB) and protocol (e.g., FCP) as well as the content of specific commands.

A protocol layer 455 positioned beneath the logical device layer 430 formats commands from the logical devices according to indicated protocols. Protocols include a 1394 FCP protocol 460, a consumer infrared protocol 465, a USB protocol 470 and a protocol 475 that uses operating system messages. The protocol layer 460 corresponds generally to the Audio 1394 Device Minidriver 220 and the Audio USB Device Minidriver 225 of FIG. 4.

A transport layer 480 is positioned beneath the protocol layer 455. The transport layer 480 transfers commands to the physical devices in a physical device layer 485. Commands formatted using the 1394 FCP protocol are transferred using the 1394 bus 20 while commands formatted according to the USB protocol 470 are transmitted using the bus 55. Typically, commands formatted using the infrared protocol 465 or the protocol 475 are transmitted using bus 20 or bus 55 to a device 490 that converts the commands to infrared signals or to a device 495 that converts the commands to radio frequency signals. The infrared or radio frequency signals are then directed to the appropriate consumer electronics device.

A considerable advantage of the layered approach is that high level items such as the applications programs 405, infrared or radio frequency remote controls 410, user interface 415 and Default Command Router 425 do not require any information about how their commands are actually routed to the appropriate physical device(s). This means that the system is sufficiently generic to control any combination of devices having 1394, USB or infrared interfaces.

Other embodiments are within the following claims.

What is claimed is:

1. A computer comprising:

a housing;

a processor positioned in the housing; and an external bus adapter configured to allow the processor to access consumer electronics devices positioned outside of the housing using an external bus, and wherein the external bus is an IEEE 1394 bus; and wherein the processor is configured to:

produce a first digital audio signal, mix the first digital audio signal with a second digital audio signal to produce a unified digital audio signal, and transmit the unified digital audio signal to a consumer electronics device using the external bus.

2. The computer of claim 1, wherein the processor is configured to maintain the first digital audio signal in synchronization with the second digital audio signal.

3. The computer of claim 1, wherein the processor is configured to produce the unified digital audio signal at a sample rate associated with the consumer electronics device.

4. The computer of claim 1, wherein a first sample rate associated with the first digital audio signal differs from a second sample rate associated with the second digital audio signal, and wherein the processor is configured to account for the difference between the first and second sample rates when producing the unified digital audio signal.

5. An entertainment system including the computer of claim 1, further comprising:
an external bus connected to the external bus adapter of the computer, and
a consumer electronics device connected to the external bus to receive the unified digital audio signal and configured to produce an analog audio signal from the unified digital audio signal.

6. The entertainment system of claim 5, further comprising speakers connected to the consumer electronics device to receive the analog audio signal and configured to produce sound based on the analog audio signal.

7. A computer system comprising:
an eternal bus;
a computer including:
a housing,
a processor positioned in the housing, and
an external bus adapter connected between the processor and the external bus and configured to allow the processor to access consumer electronics devices positioned outside of the housing using the external bus, and wherein the processor is configured to
produce a first digital audio signal in a format suitable for transmission on the external bus, and wherein the first digital audio signal includes multiple channels encoded as a single digital signal, and
transmit the first digital audio signal to a consumer electronics device using the external bus; and
a converter positioned outside of the housing of the computer and connected between the external bus and the consumer electronics device, and wherein the converter is configured to
receive the first digital audio signal from the external bus,
convert the first digital audio signal to a second digital audio signal having a format suitable for use by the consumer electronics device, and wherein the second digital audio signal includes a separate distal signal for each of the multiple channels, and
provide the second digital audio signal to the consumer electronics device.

8. The computer system of claim 7, wherein the first digital audio signal is a surround sound encoded audio signal and wherein the second digital audio signal includes separate digital audio signals corresponding to left-front, right-front, rear-right and rear-left channels.

9. A computer system comprising:
an external bus;
a converter connected to the bus and configured to receive a first digital signal from the external bus, to convert the first digital signal to a second digital signal, and to transmit the second digital signal on the external bus, and wherein the first digital audio signal includes multiple channels encoded as a single digital signal, and wherein the second digital audio signal includes a separate digital signal for each of the multiple channels; and
a computer including:
a housing,
a processor positioned in the housing, and
an external bus adapter connected between the processor and the external bus and configured to allow the processor to access consumer electronics devices positioned outside of the housing using the external bus.

10. The computer system of claim 9, wherein the processor is configured to produce the first digital signal, wherein the external bus adapter is configured to transmit the first digital signal on the external bus to the converter, and wherein the converter is configured to transmit the second digital signal on the external bus to a consumer electronics device.

11. A computer comprising:
a housing;
a processor positioned in the housing; and
an external bus adapter configured to allow the processor to access consumer electronics devices positioned outside of the housing using an external bus and wherein the external bus is an IEEE 1394 bus; and
wherein the processor is configured to:
produce a digital command signal for changing an operating parameter of a consumer electronics device, and
transmit the digital command signal to the consumer electronics device using the external bus.

12. A computer system including the computer of claim 11, further comprising an external bus connected to the external bus adapter and a consumer electronics device.

13. The computer system of claim 12, wherein the consumer electronics device is connected to the external bus for receipt of the digital command signal.

14. The computer system of claim 12, wherein the consumer electronics device is configured to receive infrared control signals, the system further comprising an infrared transmitter connected to the external bus and configured to produce an infrared signal in response to the digital command signal.

15. A method of obtaining control information for a consumer electronics devices in a system in which a computer accesses consumer electronics devices using an external bus, the method comprising the steps of:
storing control information for the consumer electronics device in a read only memory of the consumer electronics device,
attaching the consumer electronics device to an IEEE 1394 external bus,
controlling the computer to query the read only memory of the consumer electronics device,
transmitting the control information from the consumer electronics device to the computer using the external bus, and
controlling the computer to store the control information upon receipt of the control information from the external bus.

16. A digitally interconnected entertainment system comprising:
a plurality of consumer electronics devices;
a digital communications bus connected to said plurality of consumer electronics devices, said bus transferring digital audio data to and from said plurality of consumer electronics devices; and
a computer system connected to the digital communication bus and adapted to receive digital audio data from at least one of said consumer electronics devices and to send digital audio data to at least one other consumer electronics device, said compeller system comprising:
a central processing unit;

means for digitally connecting said central processing unit to said digital communications bus; and said central processing unit comprising program means for digitally mixing first and second digital audio signals to produce a unified digital audio signal, and for transmitting the unified digital audio signal to said at least one other consumer electronics device to produce an analog audio stream with negligible degradation of audio quality due to the digital mixing and transmitter to said at least one other consumer electronics device.

17. A digitally interconnected entertainment system comprising:

at least one consumer electronics device;

a digital communications bus interconnecting said at least one consumer electronics device and a computer system, said bus transferring digital audio data to and from said at least one consumer electronics device; and said computer system being adapted to send digital audio data to said at least one consumer electronics device, said computer system comprising:

means for digitally connecting said computer system to said digital communications bus; and program means for digitally mixing first and second digital audio signals to produce a unified digital audio signal, and for transmitting the unified digital audio signal to said at least one consumer electronics device to produce an analog audio stream with negligible degradation of audio quality.

18. A digitally interconnected entertainment system as recited in claim 17 further comprising at least one other consumer electronics device connected to said computer system by said digital communications bus, said at least one other consumer electronics device being adapted to transfer digital audio data to said computer system.

* * * * *

UNITED STATES PATENT AND TRADEMARK OFFICE
CERTIFICATE OF CORRECTION

PATENT NO. : 5,787,259
DATED : July 28, 1998
INVENTOR(S) : Wassef Haroun et al.

It is certified that error appears in the above-identified patent and that said Letters Patent is hereby corrected as shown below:

Col. 11, line 42, delete "distal" and replace with --digital--

Col. 12, line 36, delete "a"

Col. 12, line 66, delete "compeller" and replace with --computer--

Col. 13, line 10, delete "transmitter" and replace with --transfer--

Signed and Sealed this

Twenty-fourth Day of August, 1999

*Attest:*

Q. TODD DICKINSON

*Attesting Officer*  Acting Commissioner of Patents and Trademarks